United States Patent [19]

Fessler

[11] 4,112,128

[45] Sep. 5, 1978

[54] PROCESS OF COLD STABILIZING WINE

[76] Inventor: Julius H. Fessler, 5455 Golden Gate Ave., Oakland, Calif. 94618

[21] Appl. No.: 770,852

[22] Filed: Feb. 22, 1977

[51] Int. Cl.$^2$ .......................... C12G 1/00; C12H 1/02; C12H 1/10

[52] U.S. Cl. .................................. 426/330.4; 426/15; 426/422

[58] Field of Search ....................... 426/15, 330.4, 422

[56] References Cited

U.S. PATENT DOCUMENTS

| | | | |
|---|---|---|---|
| 1,915,273 | 6/1933 | Eoff, Jr. .............................. | 426/422 |
| 3,498,795 | 3/1970 | Walter .............................. | 426/422 X |

OTHER PUBLICATIONS

Amerine, et al., The Technology of Wine Making, 2nd ed., The Ari Publishing Co., Inc. Westport, Conn., 1967, (pp. 291-293, 562-566 & 650-652).

*Primary Examiner*—David M. Naff
*Attorney, Agent, or Firm*—Flehr, Hohbach, Test, Albritton & Herbert

[57] ABSTRACT

A method for cold stabilizing wine by the addition of a treating composition to cause precipitation of calcium tartrate. The treating composition is formed by mixing calcium carbonate or calcium hydroxide and tartaric acid in wine or water to form a slurry including seed microcrystals of calcium tartrate. The wine is agitated vigorously during the mixing step and during subsequent holding at room temperature.

5 Claims, No Drawings

PROCESS OF COLD STABILIZING WINE

BACKGROUND OF THE INVENTION

New wine is supersaturated with potassium bitartrate (cream of tartar). Unless sufficient quantities are removed, the bitartrate tends to deposit slowly during storage of the bottled wine causing a precipitate which is likely to be viewed by the consumer as a defect. Such wine is conventionally treated to render it, "cold stable", i.e., stable to such precipitation on storage, by first chilling the wine at temperatures from 15° to 25° F, depending upon the type of wine, under either continuous or intermittent circulation or holding for one week or longer, to cause some potassium acid tartrate to precipitate. Then, the cold wine is filtered to remove the precipitate to render the wine cold or tartrate stable. The above process is becoming increasingly expensive because of the high cost of energy for refrigeration.

Wine has been treated chemically for the purpose of deacidification by Boehringer Sohn. For example, many European wines are formed with an acidity on the order of 1.5% (g/100 cc of acid) or more which imparts an undesirable taste. Such wines generally include a vast excess of malic acid over tartaric acid, say, substantially greater than a ratio of 2 to 1, which accounts for the high acidity. One technique which has been employed to lower the acid content of the wine is by the addition of a calcium malate tartrate salt to the wine to precipitate malic and tartaric acid as the calcium salt from the wine. The purpose of deacidification is to significantly lower the total acid content to. say, less than 1% to render the wine more palatable. Thus, the total acidity is significantly reduced during treatment.

In general, in the technique of Boehringer Sohn the pH level of the wine is raised from about 3 to about 5.8 to favor precipitation of calcium malate tartrate. Then, this relatively high pH wine is blended back into a quantity of untreated wine to form the final product. There is no suggestion in literature supplied by Boehringer Sohn that the technique could be employed for the cold stabilization of wines which do not require deacidification.

Summary of the Invention and Objects

In accordance with the present invention, wine of acceptable total acidity for palatability is cold stabilized by chemical treatment. The technique comprises mixing a source of calcium ions such as calcium carbonate with tartaric acid in an aqueous liquid to form a treating composition including seed microcrystals of calcium tartrate. This composition is then mixed with the wine under agitation to cause the wine to roll. The wine is then held at ambient temperatures with periodic agitation to cause further rolling. The amount of treating solution and holding time are adjusted to precipitate an amount of calcium tartrate equivalent to the tartrate precipitated as potassium acid tartrate during conventional low temperature cold stabilization. This technique permits the cold stabilization of wine at ambient temperatures in less one day's time.

It is an object of the invention to provide a method for the chemical treatment of wine for cold stabilization.

It is a further object of the invention to provide a technique of the foregoing type performed at ambient temperatures and including a relatively short holding time.

It is another object of the invention to provide the foregoing technique in which the taste of the wine is not essentially modified.

Further objects and features of the invention will be apparent from the following description in which the preferred embodiment has been set forth in detail.

Detailed Description of the Preferred Embodiments

The wine to be treated in accordance with the present invention is of acceptable tartaric acid and malic acid total acidity for palatability. Such total acid content comprises less than about 1% (1 g/cc) of the wine. Such wine typically has a ratio of malic acid to tartaric acid of no greater than about 2 to 1. Typical California dessert and table wines conform to the above criteria for the wines to be treated.

Conventionally, wines of the foregoing type are cold stabilized by storage at low temperatures to precipitate potassium acid tartrate which is removed from the wine. The purpose of the present invention is to produce a cold stable wine of the same taste as one cold stabilized in the foregoing manner. Accordingly, the amount of tartrate precipitated is selected to be approximately equivalent to that precipitated in the form of potassium acid tartrate during such low temperature cold stabilization.

In accordance with the present invention, wine is cold stabilized by chemical treatment with a treating slurry composition including seed microcrystals of calcium tartrate. Such slurry is formed by mixing a source of calcium ion and tartaric acid in an aqueous liquid which causes the substantially insoluble calcium tartrate to precipitate as microcrystals. The source of calcium ion may be calcium carbonate or calcium hydroxide. If desired, wine may be employed as the aqueous liquid carrier for the slurry. In that instance, a portion of the tartaric acid naturally present in the wine is employed as the source of tartrate for the microcrystals.

A wide range of ratios of calcium to tartaric acid may be employed for purposes of the present invention. However, it has been found that an optimum treating composition is formed of the active ingredients of (a) about 70 - 95 parts by weight of calcium, say in the form of calcium carbonate, and (b) about 5 to 30 parts by weight of tartaric acid. A particularly effective mixture of said active ingredients comprises about 10 to 20% tartaric acid and 80 to 90% of calcium carbonate. At values significantly above or below the foregoing ranges, the efficiency of precipitation of calcium tartrate in the wine to be treated is reduced.

Chemical treatment of the present invention is for the purpose of accelerating the precipitation of tartrate from the wine in comparison to cold stabilization by conventional techniques. The calcium tartrate seed crystals in the slurry accelerates precipitation of tartrate in the form of calcium tartrate. The principle of using seed crystals to accelerate precipitation from a supersaturated solution is well known.

In accordance with the present invention, the slurry of calcium tartrate seed microcrystals is first mixed with the wine under substantial agitation. The agitation is sufficient to cause "rolling" of the wine. Such rolling is defined as a visible movement of the wine mass so that the bottom layer of the wine moves upwardly along the sides of the vat or other treatment container to the center where the wine is drawn downwardly in a continuous motion. However, agitation is not so great that a vortex would form which would draw significant quantities of air into the wine during treatment. A typical amount of agitation which accomplishes this objective would be by using a stirrer of 80 rpm in an 8,000 gallon tank driven by a 3-horsepower motor.

After the slurry is mixed with the wine to be treated, the wine is held at ambient temperature with periodic agitation to cause further rolling of the wine. The holding time is sufficient to cold stabilize the wine. Cold stability is achieved by the precipitation of an amount of tartrate in the form of calcium tartrate approximately equivalent to that precipitated in the form of potassium acid tartrate during conventional low temperature cold stabilization. Then, the calcium tartrate precipitate is removed from the wine.

In accordance with the above procedure, the final wine product contains acidity quite similar to that which would be obtained by conventional cold stabilization. Thus, the reduction in total acidity during treatment of the wine is generally less than about 0.2%. In this manner, the palatability of the wine is not modified in comparison to wine which is stabilized by the natural precipitation of potassium acid tartrate. Also, the pH level of the wine is not significantly varied, say, by more than 0.2 pH units. this is to be contrasted with the deacidification technique of Boehringer Sohn disclosed in the background of the invention in which the entire purpose of treatment is to reduce the total acidity of the wine and the pH level is significantly raised during this treatment process to accelerate the precipitation of calcium malate tartrate.

Another feature of the present method is that the primary constituent removed from the wine is tartrate, in the form of calcium tartrate. In contrast, the wines requiring deacidification generally have a large excess of malic acid to tartaric acid. Thus, during precipitation, the major acid removed is malic acid.

A major feature of the present invention is the rapid cold stabilization of the wine obtained by rolling of the wine during mixing and then periodically during holding at ambient temperature. Such periodic rolling may be accomplished by stirring for 15 minutes each hour for about 6 hours. Cold stabilization is achieved in from 6 to 24 hours. This is to be contrasted with the lower degree of agitation which would be provided by continuous pumping of the wine through a vat in which case cold stabilization would take as long as many weeks.

It has been found that the calcium ion concentration provides a measure of cold stability. That is, the wine is generally cold table when the calcium content of the wine after treatment and holding is approximately equal to that of the wine prior to treatment.

The ratio of the treating solution to the wine is dependent upon the tartrate composition to be removed for cold stability. The below examples set forth typical suitable ratios.

A further disclosure of the nature of the present invention is provided by the following specific examples of the practice of the invention. It should be understood that the data disclosed serve only as examples and are not intended to limit the scope of the invention.

EXAMPLE 1

A treating composition was formed by mixing 8.5 grams of calcium carbonate and 1.5 grams of tartaric acid in 100 cc of wine to form a 10% slurry which includes calcium tartrate microcrystals and excess calcium carbonate precipitate. 18 pounds of this slurry was then mixed with 1,000 gallons of wine under sufficient agitation for rolling. In this instance, such agitation was imparted by a stirrer operated at 80 rpm. The slurry was added to the wine over an interval of 30 to 60 minutes. Agitation was continued for approximately one hour after complete addition of the slurry. Thereafter, the wine was agitated for approximately 15 minutes of each hour for the first 8 to 12 hours of holding. Then, the wine was further agitation until precipitation of calcium tartrate was essentially complete.

In the specific example, the calcium content was as set forth in the following table:

TABLE 1

| Wine Sample 1 | Calcium (ppm) |
|---|---|
| Control (no treatment) | 85 |
| Treated Wine (time after slurry addition) | |
| 1 hour | 140 |
| 24 hours | 80 |
| 72 hours | 67 |

It was found that the wine was cold stable after a 24 hour holding period.

EXAMPLE 2

The procedure of Example 1 was followed except the treating slurry was added at a concentration of 10 pounds of calcium carbonate-tartrate in slurry form per 1,000 gallon of wine.

TABLE 2

| Wine Sample 2 | Calcium (ppm) |
|---|---|
| Control (no treatment) | 83 |
| Treated Wine (time after slurry addition) | |
| 2.5 hour | 85 |
| 5.5 hours | 73 |

It was found that after 5.5 hour, the wine was cold stable.

EXAMPLE 3

The procedure of Example 2 was followed. The calcium concentration was as set forth in the following table:

TABLE 3

| Wine Sample 3 | Calcium (ppm) |
|---|---|
| Treated Wine (time after slurry addition) | |
| 3 hours | 90 |
| 24 hours | 74 |

It was found that the wine was cold stable after a 24 hour holding period.

EXAMPLE 4

The procedure of Example 1 was followed with 8,000 gallons of wine employing 27 pounds of calcium carbonate and calcium tartrate in slurry form per 1,000 gallons of wine.

TABLE 4

| Wine Sample 4 | Calcium (ppm) |
|---|---|
| Control (no treatment) | 62 |
| Treated Wine (time after slurry addition) | |
| 3 hours | 112 |
| 6 hours | 79 |
| 24 hours | 60 |

The wine was cold stable after a 24 hour holding period.

What is claimed is:

1. A method for chemically treating wine to cold stabilize the wine at ambient temperature in less than 1 day's time, said wine to be chemically treated having a total acidity of tartaric acid and malic acid of less than about 1% of the wine, said method comprising the steps of;

(a) mixing a source of calcium ion and tartaric acid in an aqueous liquid to form a treating composition comprising a slurry including seed microcrystals of calcium tartrate, said calcium ion source being selected from the group consisting of calcium carbonate and calcium hydroxide, the ratio of calcium ion to tartaric acid in said treating composition being that formed from about 70 – 95 parts by weight calcium carbonate or an equivalent amount of calcium hydroxide; and about 5 – 30 parts by weight tartaric acid, (b) mixing said treating composition with the wine to be treated under sufficient agitation to cause rolling of the wine, (c) holding the wine at ambient temperature with periodic agitation to cause further rolling for a sufficient time to cold stabilize the wine by precipitating an amount of calcium tartrate approximately equivalent to that precipitated in the form of potassium acid tartrate during conventional low temperature cold stabilization, and (d) removing precipitate from the wine, the major portion of said precipitate being calcium tartrate.

2. The method of claim 1 in which the ratio of malic acid to tartaric acid of the wine to be treated is no greater than about 2 to 1.

3. The method of claim 1 in which said aqueous liquid in step (a) comprises wine.

4. The method of claim 1 in which the reduction in total acidity during treatment of the wine is no greater than about 0.2 g/cc.

5. The method of claim 1 in which said calcium source comprises calcium carbonate.